Oct. 24, 1933.  W. B. DAMSEL ET AL  1,931,922
LAMINATED ARTICLE
Filed July 2, 1930   2 Sheets-Sheet 1

Inventors
William B. Damsel
William C. Damsel,
By Seymour & Bright
Attorneys

Oct. 24, 1933. W. B. DAMSEL ET AL 1,931,922
LAMINATED ARTICLE
Filed July 2, 1930  2 Sheets-Sheet 2

Inventors
William B. Damsel
William C. Damsel,
By Seymour Bright
Attorneys

Patented Oct. 24, 1933

1,931,922

UNITED STATES PATENT OFFICE 1,931,922

LAMINATED ARTICLE

William B. Damsel and William C. Damsel, New York, N. Y.

Application July 2, 1930. Serial No. 465,434

5 Claims. (Cl. 154—45.5)

This invention relates to improvements in laminated gaskets or the like.

It is well known that rubber and rubber compositions are deleteriously affected by certain substances, and consequently, when such materials are used in packing rings and the like, they frequently deteriorate to the point where they are no longer useful to serve the purpose for which they were intended. For example, it has been recognized that rubber or rubber composition packing rings used with oil or gas pipe lines are affected by such fluids to such an extent as to cause leaky joints which necessitates replacement of the rings.

Various efforts have been made in the past to overcome such disadvantages, principally by making the packing material of some special composition.

We have discovered that the problem can be solved while still retaining the use of the rubber or rubber composition packing material, if the latter is protected at all surfaces which are liable to come into contact with the fluid transported or conveyed. For instance, we employ a protecting material which lacks porosity or much elasticity, as a surfacing substance on a material having the elasticity and tensile strength of rubber or rubber compositions.

From the above it will be understood that the primary object of the present invention is to provide a packing gasket or the like, formed of rubber, rubber composition, or the equivalent thereof, with a protecting surface which is non-porous and non-corrosive. One such protecting material is known as Thiokol. It is a plastic having mechanical properties generally resembling those of soft vulcanized rubber, containing between about 74% and 84% of combined sulfur, the remainder being mainly carbon and hydrogen. Such a plastic is practically oil proof and resistant to attack or corrosion by oils and gases. Naturally, other substances may be used for protecting purposes, such as asbestos, fabrics, metals and condensation products, providing such materials are non-porous and non-corrosive, and have sufficient elasticity so as not to interfere with the proper functioning of the rubber or rubber composition backing.

With the foregoing objects outlined and with other objects in view which will appear as the description proceeds, the invention consists in the novel features hereinafter described in detail, illustrated in the accompanying drawings, and more particularly pointed out in the appended claims.

Figure 3:
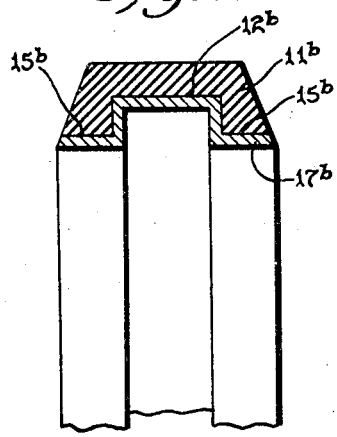
Figure 4:
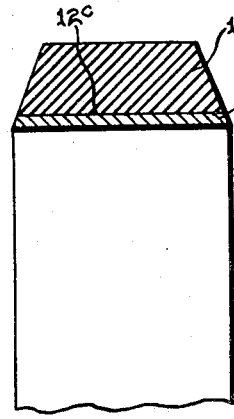
Figure 5:
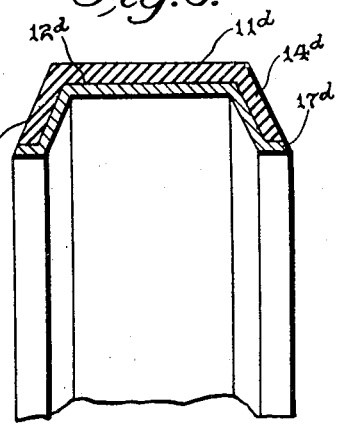

Figs. 3 to 5 inclusive are like views of other types of rings lined with the protecting material.

Figure 1:
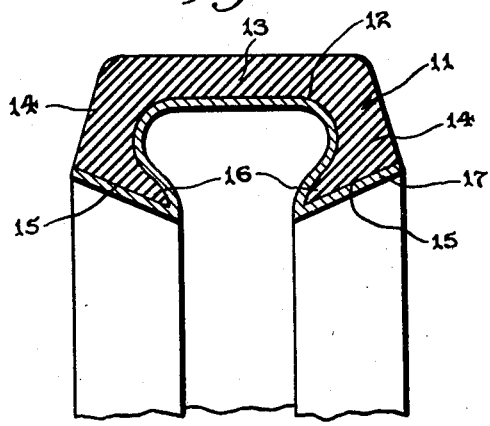
Fig. 1 is a radial sectional view of a portion of one form of packing ring having an internal groove and diverging annular surfaces coated with a protecting agent of the type heretofore mentioned.
Figure 2:
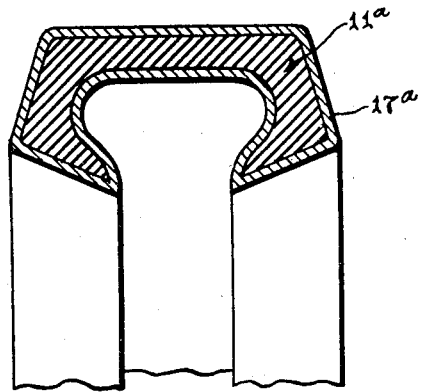
Fig. 2 is a similar view of a modification of such a ring, in which the coating material completely encloses the rubber or rubber composition core of the ring.
Figure 6:
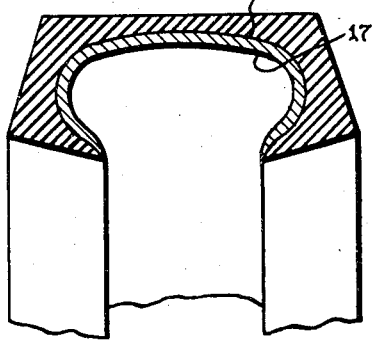

Fig. 6 is a radial sectional view of a portion of a ring similar to that shown in Figs. 1 and 2, but in which the resilient ring is protected only along the internal annular groove thereof.

Figure 7:
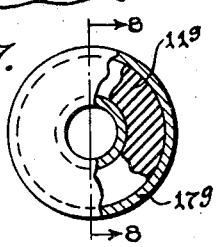

Fig. 7 is a plan view partly in section, of a resilient washer entirely enclosed in a protecting agent of the non-porous and non-corrosive character mentioned above.

Figure 8:
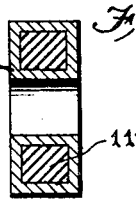

Fig. 8 is a sectional view of the washer on the line 8—8 of Fig. 7.

Figure 9:
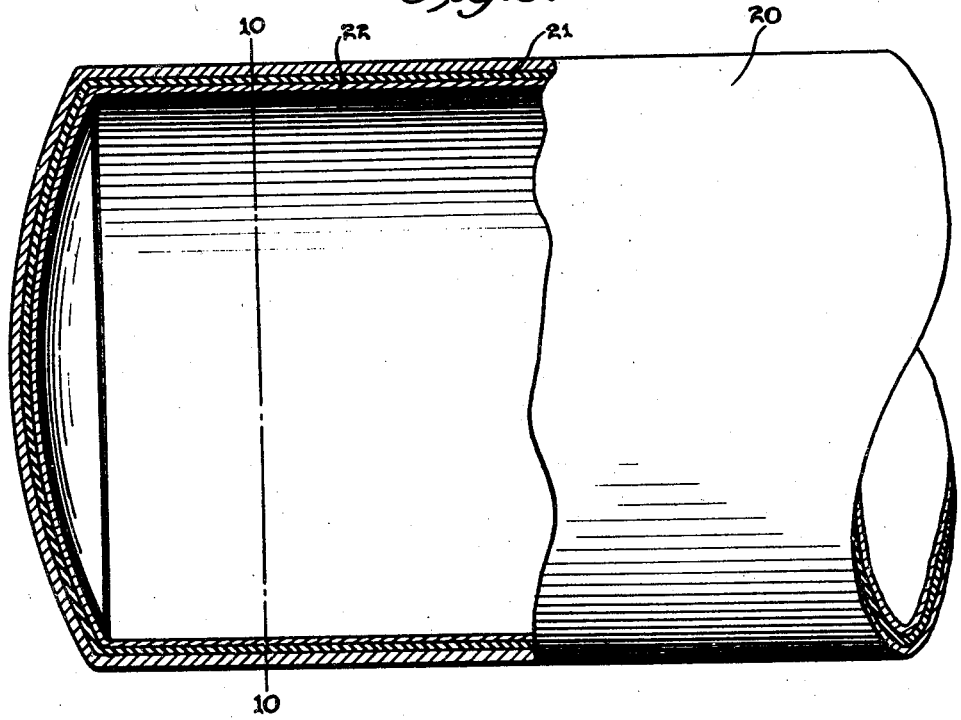

Fig. 9 is an elevation partly in vertical section of a tank lined with rubber or the like, and having its lining protected by a non-porous and non-corrosive substance.

Figure 10:
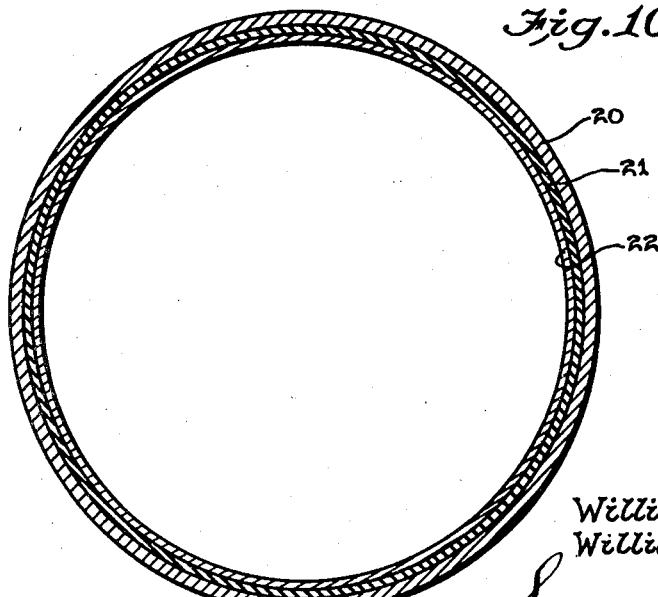

Fig. 10 is a transverse sectional view of such tank, on the line 10—10 of Fig. 9.

In the embodiment of the invention illustrated in Fig. 1, 11 designates a rubber or rubber composition packing gasket of the type disclosed in the patent to Tribe No. 1,541,601. Such a ring has an internal annular groove 12 formed by the collar 13 and its inwardly projecting flanges 14, the latter terminating in flaring annular surfaces 15 to provide sealing lips 16. When a ring of this type is used in a pipe coupling, the ends of adjacent pipes are inserted into the packing ring and cause the surfaces 15 to move into alignment with the axes of the pipes, and to snugly engage the peripheries of the pipes. The ends of the pipes are spaced slightly apart so that the fluid conducted through the pipe line will enter the groove 12, and if such fluid is under pressure, such pressure will press the lips 16 against the pipes.

It has been found in practice that some fluids conveyed through such a pipe line, attack the gaskets, and to overcome this difficulty, we line such a ring with a coating 17 of some suitable protecting material which will prevent the conducted fluid from reaching the ring 11, which will not corrode, and which has sufficient elasticity so as not to interfere with the resiliency of the ring 11. As before stated, such protecting lining may be made of a plastic having mechanical properties generally resembling those of soft vulcanized rubber, containing between about 74% and 84% of sulfur and derived from the interaction of ethylene compounds with soluble polysulfides containing about three to five times the amount of sulfide in the corresponding normal sulfide, or a plastic consisting mainly of combined sulfur and derived from the interaction of additive halogen compounds of olefines and polysulfides. One feature in favor of the use of such material is that it vulcanizes practically at the same temperature as rubber or the rubber compositions used in making packing rings and gaskets. However, other protecting mediums may be used, providing such medium is non-porous, non-corrosive, and has sufficient elasticity so as not to interfere with the resiliency of the backing ring. For example, certain types of asbestos, fabrics, metals and condensation products are suitable for our purposes.

Instead of lining only the groove and the flaring surfaces 15 of the ring, the entire ring 11a may be enclosed, as shown at 17a in Fig. 2, with such protecting material.

In Fig. 3, another type of rubber, rubber composition or the like, ring 11b is shown, and this ring has a square cut groove 12b and cylindrical surfaces 15b protected by a lining 17b of the kind heretofore set forth.

In the form of the invention shown in Fig. 4, the resilient ring 11c has a plain cylindrical internal surface 12c lined with a cylindrical protector 17c.

Still another type of ring is shown in Fig. 5. This rubber or rubber composition ring 11d has inwardly extending diverging annular lips 14d providing an internal annular groove 12d, which groove, as well as the edges of the lips are protected by a specially shaped annulus 17d of the kind heretofore mentioned.

In the modification of the Tribe type ring shown in Fig. 6, the protecting lining 17e coats only the interior of the annular groove 12e, and at this point it may be mentioned that in some cases, it may be necessary to coat only the interior of the groove, while in other instances, the inner surfaces of the flanges or the entire resilient ring will have to be protected, due to the exposure of the same to the fluids being conveyed. In other words, we will use only so much protecting material as is necessary for each particular installation.

We prefer in all cases, to securely fasten the protecting coating to the backing of rubber or the like.

Of course, the invention is not confined to the protection of packing rings or gaskets, for it may be used in other environments. For instance, a rubber or rubber composition washer 11g shown in Figs. 7 and 8 has all of its surfaces coated by a protecting cover of thiocol or the other protecting materials heretofore mentioned.

We also contemplate the employment of sheet material composed of laminations of rubber or the like, and thiocol or its equivalent, for the purpose of lining tank cars and other receptacles for the storage or transportation of corrosive fluids. For example, as shown in Figs. 9 and 10, a metal tank 20 may be lined with such sheet material. In these figures, the rubber or the like is shown at 21, and the protecting coating of non-corrosive and non-porous material is shown at 22.

From the foregoing it is believed that the invention, as well as the advantages thereof may be readily understood by those skilled in the art, and we are aware that changes may be made in the details disclosed, without departing from the spirit of the invention, as expressed in the claims.

What we claim and desire to secure by Letters Patent is:

1. A packing ring or the like, formed of resilient material having the elastic characteristics and tensile strength of rubber and provided with an internal annular groove coated with a non-corrosive and non-porous plastic material having relatively no tensile strength and which does not interfere with the resiliency of the ring, such coating being vulcanized to the ring.

2. An article of manufacture comprising a backing of resilient material such as rubber, having a surface thereof protected by a non-porous, non-corrosive plastic coating which is bonded thereto and which will not interfere with the resiliency of the backing, said coating having mechanical properties generally resembling those of soft vulcanized rubber and being substantially as resilient as the backing to prevent cracking or peeling of the coating from the backing when the latter is flexed, said coating being capable of vulcanization at substantially the same temperature as said backing and being insoluble in alcohol, benzine and various acids.

3. An article of manufacture comprising a packing ring of resilient material having the elastic characteristics and tensile strength of gasket rubber, and a plastic coating bonded to a surface of said ring, said coating being non-porous, non-corrosive and of substantially the same resiliency as the packing ring to prevent cracking or peeling of the coating from the ring when the latter is flexed, said coating being vulcanizable at substantially the same temperature as the packing ring, and being insoluble in alcohol, naphtha and various acids.

4. An article of manufacture comprising a packing ring of resilient material having the elastic characteristics and tensile strength of gasket rubber, and a plastic coating bonded to a surface of said ring, said coating being non-porous, non-corrosive and of substantially the same resiliency as the packing ring to prevent cracking or peeling of the coating from the ring when the latter is flexed, said coating being vulcanizable at substantially the same temperature as the packing ring and being insoluble in alcohol, naphtha and various acids, said coating being arranged on an annular internal surface of the ring.

5. An article of manufacture comprising a packing ring of resilient material having the elastic characteristics and tensile strength of gasket rubber, and a plastic coating bonded to a surface of said ring, said coating being non-porous, non-corrosive and of substantially the same resiliency as the packing ring to prevent cracking or peeling of the coating from the ring when the latter is flexed, said coating being vulcanizable at substantially the same temperature as the packing ring and being insoluble in alcohol, naphtha and various acids, said ring having an internal annular groove, and said coating forming a lining for said groove.

WILLIAM B. DAMSEL.
WILLIAM C. DAMSEL.